US009100417B2

(12) United States Patent
Garg et al.

(10) Patent No.: US 9,100,417 B2
(45) Date of Patent: *Aug. 4, 2015

(54) MULTI-NODE AND MULTI-CALL STATE MACHINE PROFILING FOR DETECTING SPIT

(75) Inventors: Sachin Garg, Bangalore (IN); Navjot Singh, Denville, NJ (US); Akshay Adhikari, Santa Clara, CA (US); Yu-Sung Wu, West Lafayette, IN (US)

(73) Assignee: Avaya Inc., Basking Ridge, NJ (US)

( * ) Notice: Subject to any disclaimer, the term of this patent is extended or adjusted under 35 U.S.C. 154(b) by 1389 days.

This patent is subject to a terminal disclaimer.

(21) Appl. No.: 12/115,199

(22) Filed: May 5, 2008
(Under 37 CFR 1.47)

(65) Prior Publication Data

US 2009/0274144 A1 Nov. 5, 2009

(51) Int. Cl.
| | |
|---|---|
| *H04L 12/66* | (2006.01) |
| *G06F 17/00* | (2006.01) |
| *H04L 29/06* | (2006.01) |
| *H04M 7/00* | (2006.01) |
| *G06F 21/51* | (2013.01) |
| *G06F 21/56* | (2013.01) |

(52) U.S. Cl.
CPC ........ *H04L 65/1079* (2013.01); *H04L 65/1006* (2013.01); *G06F 21/51* (2013.01); *G06F 21/56* (2013.01); *H04L 63/1408* (2013.01); *H04L 63/1416* (2013.01); *H04L 63/1425* (2013.01); *H04M 7/006* (2013.01); *H04M 7/0078* (2013.01)

(58) Field of Classification Search
USPC ........................... 370/352; 726/22, 23, 24, 25
See application file for complete search history.

(56) References Cited

U.S. PATENT DOCUMENTS

| | | | |
|---|---|---|---|
| 5,557,742 A | 9/1996 | Smaha et al. | |
| 6,789,202 B1 | 9/2004 | Ko et al. | |
| 6,880,087 B1 | 4/2005 | Carter | |
| 7,262,697 B2 | 8/2007 | Meng et al. | |
| 7,370,357 B2 | 5/2008 | Sekar | |
| 7,441,429 B1 * | 10/2008 | Nucci et al. | 70/229 |
| 7,653,188 B2 * | 1/2010 | Kloberdans et al. | 379/145 |
| 8,005,074 B2 * | 8/2011 | Tartarelli et al. | 370/352 |
| 8,045,464 B1 * | 10/2011 | Nucci et al. | 370/231 |
| 2001/0052014 A1 * | 12/2001 | Sheymov et al. | 709/225 |
| 2003/0185370 A1 | 10/2003 | Rosera et al. | |
| 2005/0111460 A1 | 5/2005 | Sahita | |

(Continued)

OTHER PUBLICATIONS

Chen, Eric Y., "Detecting DoS Attacks on SIP Systems", "1st IEEE Workshop on VoIP Management and Security XP-010919088", Apr. 3, 2006, pp. 51-56, Publisher: IEEE.

(Continued)

*Primary Examiner* — Fatoumata Traore
(74) *Attorney, Agent, or Firm* — Maldjian Law Group LLC

(57) ABSTRACT

An apparatus and method for detecting potentially-improper call behavior (e.g., SPIT, etc.) are disclosed. The illustrative embodiment of the present invention is based on finite-state machines (FSMs) that represent the legal states and state transitions of communications protocols at nodes during Voice over Internet Protocol (VoIP) calls. In accordance with the illustrative embodiment, a library of FSM execution profiles associated with improper call behavior and a set of rules (or rule base) associated with improper FSM behavior over one or more calls are maintained. When the behavior of one or more finite-state machines during one or more calls matches either an execution profile in the library or a rule in the rule base, an alert is generated.

13 Claims, 6 Drawing Sheets

(56) References Cited

U.S. PATENT DOCUMENTS

| | | | |
|---|---|---|---|
| 2005/0201363 A1* | 9/2005 | Gilchrist et al. | 370/352 |
| 2005/0229246 A1 | 10/2005 | Rajagopal et al. | |
| 2005/0234915 A1 | 10/2005 | Ricciulli | |
| 2006/0075497 A1 | 4/2006 | Garg et al. | |
| 2006/0075498 A1 | 4/2006 | Yeom | |
| 2006/0119486 A1 | 6/2006 | Kim et al. | |
| 2006/0137009 A1 | 6/2006 | Chesla | |
| 2006/0190592 A1 | 8/2006 | Fujita et al. | |
| 2006/0195896 A1 | 8/2006 | Fulp et al. | |
| 2006/0288413 A1 | 12/2006 | Kubota | |
| 2007/0036314 A1* | 2/2007 | Kloberdans et al. | 379/189 |
| 2007/0121596 A1 | 5/2007 | Kurapati et al. | |
| 2007/0133757 A1* | 6/2007 | Girouard et al. | 379/67.1 |
| 2007/0143846 A1 | 6/2007 | Lu | |
| 2007/0150276 A1* | 6/2007 | Srivastava et al. | 704/246 |
| 2007/0150773 A1* | 6/2007 | Srivastava | 714/49 |
| 2007/0165811 A1* | 7/2007 | Reumann et al. | 379/201.01 |
| 2007/0177615 A1 | 8/2007 | Miliefsky | |
| 2007/0180527 A1 | 8/2007 | Yeom | |
| 2007/0201660 A1* | 8/2007 | Lan et al. | 379/201.01 |
| 2008/0037440 A1 | 2/2008 | Politowicz | |
| 2008/0043980 A1* | 2/2008 | Delmege et al. | 379/242 |
| 2008/0084975 A1* | 4/2008 | Schwartz | 379/88.22 |
| 2008/0263648 A1* | 10/2008 | Sathyan et al. | 726/7 |
| 2009/0028135 A1* | 1/2009 | Mantripragada et al. | 370/352 |
| 2009/0034527 A1* | 2/2009 | Mathieu et al. | 370/392 |
| 2009/0067410 A1* | 3/2009 | Sterman et al. | 370/352 |
| 2009/0106183 A1 | 4/2009 | Estan et al. | |
| 2009/0106318 A1* | 4/2009 | Mantripragada et al. | 707/104.1 |
| 2009/0202057 A1* | 8/2009 | Tartarelli et al. | 379/142.04 |
| 2010/0002686 A1* | 1/2010 | Rosenberg et al. | 370/352 |
| 2010/0154057 A1* | 6/2010 | Ko et al. | 726/23 |
| 2010/0284282 A1* | 11/2010 | Golic | 370/242 |
| 2010/0284283 A1* | 11/2010 | Golic et al. | 370/242 |
| 2010/0306820 A1* | 12/2010 | Battistello et al. | 726/3 |
| 2010/0328074 A1* | 12/2010 | Johnson et al. | 340/573.1 |
| 2011/0066849 A1* | 3/2011 | Niccolini et al. | 713/156 |

OTHER PUBLICATIONS

Ding et al., "Intrusion detection system for signal based SIP attacks through timed HCPN", "Second International Conference on Availability, Reliability and Security XP-031079585", Apr. 1, 2007, pp. 190-197, Publisher: IEEE Computer Society.

Jiang et al., "Temporal and Spatial Distributed Event Correlation for Network Security", Jun. 30, 2004, Publisher: American Control Conference 2004 Boston Massachusetts, Published in: US.

Khanna et al., "Self Checking Network Protocols: A Monitor Based Approach", Oct. 18, 2004, Publisher: Symposium on Reliable Distributed Systems 2004, Published in: US.

Barry et al., "Towards Intelligent Cross Protocol Intrusion Detection in the Next Generation Networks based on Protocol Anomaly Detecti", "9th International Conference on Advanced Communication Technology XP-031085043", Feb. 12-14, 2007, pp. 1505-1510.

Sengar et al., "VoIP Intrusion Detection Through Interacting Protocol State Machines", "Proceedings of the 2006 International Conference on Dependable Systems and Networks XP-010925326", Jun. 25, 2006, pp. 393-402, Publisher: IEEE Computer Society.

Lamelas Polo, Yvan, "EP Application No. 08163848.8 European Search Report Nov. 30, 2010", , Publisher: EPO, Published in: EP.

Khoshnoodi, Nadia, "U.S. Appl. No. 11/854,437 Office Action Mar. 4, 2011", , Publisher: USPTO, Published in: US.

Khoshnoodi, Nadia, "U.S. Appl. No. 11/854,437 Office Action Sep. 15, 2010", , Publisher: USPTO, Published in: US.

Schossmaier, Klaus, "EP Application No. 08014898.4 Office Action Aug. 9, 2010", , Publisher: EPO, Published in: EP.

Schossmaier, Klaus, "EP Application No. 08014898.4 Search Report", Feb. 5, 2009, Publisher: EPO, Published in: EP.

Kabir, Jahangir, "U.S. Appl. No. 11/854,439 Office Action Feb. 18, 2011", , Publisher: USPTO, Published in: US.

Kabir, Jahangir, "U.S. Appl. No. 11/854,439 Office Action Sep. 2, 2010", , Publisher: USPTO, Published in: US.

Sekar, R. et al., "Specification-based Anomaly Detection: A New Approach for Detecting Network Instructions," 2002, 10 pages.

Avaya Inc., Japanese Patent Application No. 2008-230503, Office Action dated May 27, 2013, 1 page.

* cited by examiner

US 9,100,417 B2

MULTI-NODE AND MULTI-CALL STATE MACHINE PROFILING FOR DETECTING SPIT

CROSS-REFERENCE TO RELATED APPLICATIONS

The following patent applications are incorporated by reference:
1. U.S. patent application Ser. No. 11/854,437, filed 12 Sep. 2007, entitled "Signature-Free Intrusion Detection," published as U.S. Patent Application Pub. No. 2009/0070874; and
2. U.S. patent application Ser. No. 11/854,439, filed 12 Sep. 2007, entitled "Distributed Stateful Intrusion Detection for Voice Over IP," published as U.S. Patent Application Pub. No. 2009/0070875.

FIELD OF THE INVENTION

The present invention relates to telecommunications in general, and, more particularly, to Internet telephony.

BACKGROUND OF THE INVENTION

As Voice over Internet Protocol (or Voice over IP) telephony has proliferated, so have unwanted, automatically-dialed, pre-recorded Voice over IP phone calls by telemarketers and prank callers. Such calls have become known as "Voice over IP Spam", or "SPIT" (Spam over Internet Telephony). As a result, a number of techniques have been developed to try to detect SPIT, as well as other types of unwanted or malicious actions perpetrated via calls (e.g., network abuse, attacks on data-processing systems, etc.).

One such technique utilizes a database of profiles that specify various characteristics of such calls, much like an attack signature database is utilized in an intrusion detection system (IDS). For example, a profile database might contain a profile that indicates that successive calls to multiple telephone extensions of an enterprise from the same caller are likely unwanted calls. As another example, a profile might indicate that a call to a residence during dinner time with suppressed Caller ID information is likely an unwanted call.

SUMMARY OF THE INVENTION

The present invention is based on the use of finite-state machines to represent the legal states and state transitions of a communications protocol at a node during a Voice over Internet Protocol (VoIP) call, a concept introduced in U.S. patent application Ser. No. 11/854,437, entitled "Signature-Free Intrusion Detection," filed Sep. 12, 2007, and in U.S. patent application Ser. No. 11/854,439, entitled "Distributed Stateful Intrusion Detection for Voice Over IP," filed Sep. 12, 2007, both of which are incorporated by reference.

In accordance with the illustrative embodiment of the present invention, the execution of such finite-state machines is observed for SPIT and other types of improper calls, and from these observations execution profiles and rules are derived that characterize behaviors of finite-state machines associated with improper calls. The execution profiles are collected into an execution profile library, and the rules are collected into a rule base.

In accordance with the illustrative embodiment, a call-monitoring system monitors the execution of finite-state machines at nodes during calls, and when the execution of one or more finite-state machines matches any of the execution profiles in the library or any of the rules in the rule base, an alert is generated that indicates potentially-improper call behavior. Thus, in contrast to the coarser-grained profiles of the prior art that characterize the calls themselves (e.g., the duration of calls, the frequency of calls, etc.), the present invention utilizes profiles of the execution of finite-state machines that correspond to the communication protocols underlying calls.

The illustrative embodiment comprises: determining whether the execution of an instance of a first finite-state machine and an instance of a second finite-state machine during a call matches one or more execution profiles that are associated with improper call behavior, wherein the instance of the finite-state machine corresponds to the state of a communications protocol at a first node, and wherein the instance of the second finite-state machine corresponds to the state of a communications protocol at a second node, and wherein at least one of the execution profiles characterizes the execution of a plurality of finite-state machines during a call; and when a match exists, generating a signal that indicates a possible occurrence of improper call behavior.

DETAILED DESCRIPTION

For the purposes of this specification, the following terms and their inflected forms are defined as follows:

The term "node" is defined as an endpoint in a network (e.g., a telecommunications terminal, a gateway, a router, a server, a firewall, an intrusion-detection system, etc.).

The term "VoIP node" is defined as a node that is capable of receiving, transmitting, and/or processing Voice-over-Internet Protocol (VoIP) messages.

The term "improper call behavior" is defined to refer to SPIT or other types of unwanted or malicious actions that are perpetrated via calls (e.g., network abuse, attacks on data-processing systems, etc.)

Figure 1:
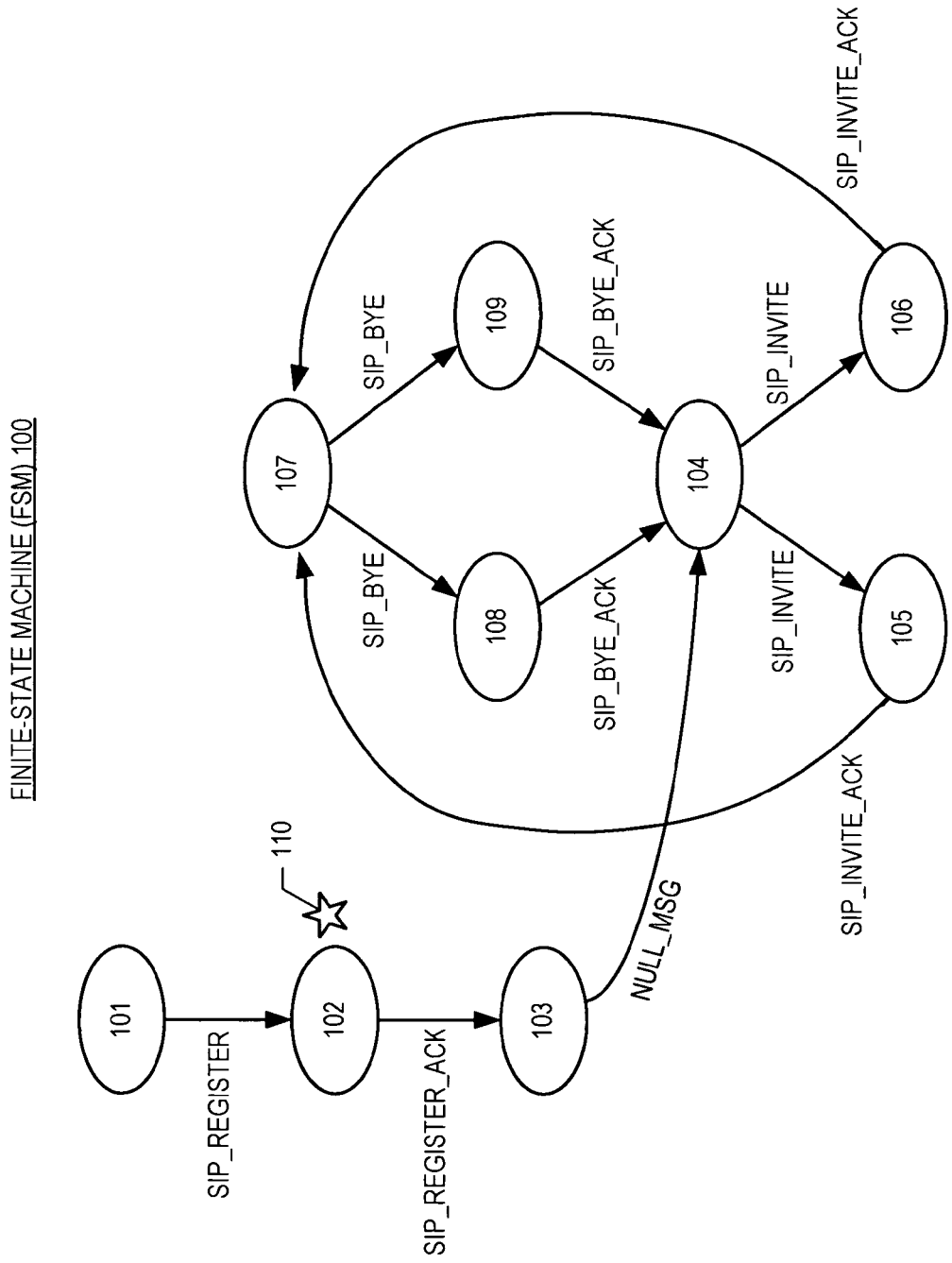
FIG. 1 depicts illustrative finite-state machine 100, in accordance with the illustrative embodiment of the present invention.

FIG. 1 depicts illustrative finite-state machine (FSM) 100, in accordance with the illustrative embodiment of the present invention. In particular, finite-state machine 100 corresponds to the legal states and state transitions of the Session Initiation Protocol (SIP) at a calling VoIP-capable terminal.

As shown in FIG. 1, finite-state machine (FSM) 100 comprises nine states 101 through 109, where 101 is the starting state for a SIP session at a VoIP-capable calling terminal, and token 110, which keeps track of the current state of finite-state machine (FSM) 100 (state 102 in FIG. 1). Each arc (or directed edge) in finite-state machine (FSM) 100 indicates a legal transition from a first state to a second state, where the label on the arc indicates a type of message (e.g., SIP_INVITE, SIP_INVITE_ACK, etc.) received or transmitted by the calling VoIP-capable terminal that engenders the state transition.

As will be appreciated by those skilled in the art, although in illustrative finite-state machine (FSM) 100 every arc label corresponds to a message received or transmitted by the calling VoIP-capable terminal, in some other embodiments of the present invention a finite-state machine (FSM) might have one or more arc labels that correspond to a message that does not involve the calling VoIP-capable terminal at all. Moreover, in some other embodiments of the present invention, a finite-state machine (FSM) might have one or more arc labels that correspond to a signal other than a protocol-related message (e.g., a remote procedure call, some other kind of message, etc.). In any case, it will be clear to those skilled in the art, after reading this disclosure, how to formulate and use finite-state machines with these various kinds of arc labels.

Figure 2:
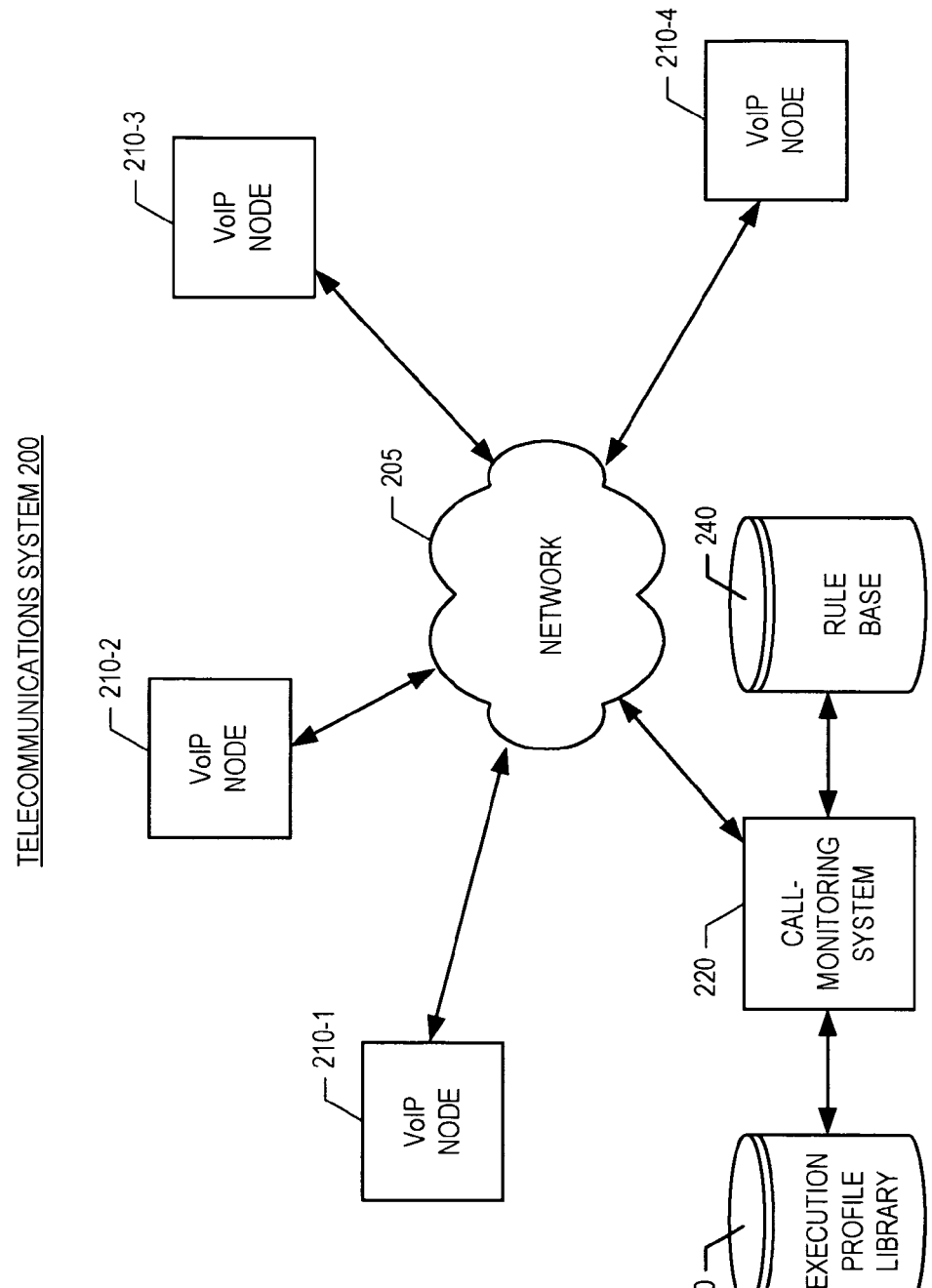
FIG. 2 depicts a telecommunications system in accordance with the illustrative embodiment of the present invention.

FIG. 2 depicts telecommunications system 200 in accordance with the illustrative embodiment of the present invention. As shown in FIG. 2, telecommunications system 200 comprises network 205, four Voice-over-IP (VoIP) nodes 210-1 through 210-4, call-monitoring system 220, execution profile library 230, and rule base 240, interconnected as shown.

Network 205 is capable of transporting messages between a source (e.g., one of VoIP nodes 210-1 through 210-4, from IDS 220, etc.) and destination (e.g., one of VoIP nodes 210-1 through 210-4, from IDS 220, etc.) in well-known fashion. As will be appreciated by those skilled in the art, network 205 is depicted in FIG. 2 in a conceptual and abstract manner: in some embodiments network 205 might be a wireless network, while in some other embodiments network 205 might be a wired network, while in yet some other embodiments network 205 might comprise both wired and wireless technologies, or might in fact comprise a plurality of constituent networks (for example, a combination of the Public Switched Telephone Network [PSTN], the Internet, and a wireless local-area network). As will be further appreciated by those skilled in the art, the fact that telecommunications system 200 comprises four VoIP nodes is merely illustrative, and in some other embodiments there might be a fewer number or greater number of VoIP nodes 210.

Each VoIP node 210-i, where i is an integer between 1 and 4 inclusive, is one of a VoIP-capable terminal, server, gateway, etc. that is capable of transmitting and receiving messages in accordance with one or more Voice-over-IP protocols (e.g., Session Initiation Protocol [SIP], Real-time Transport Protocol [RTP], etc.), in well-known fashion. In accordance with the illustrative embodiment, each VoIP node 210-i is programmed to notify call-monitoring system 220 of any finite-state machine (FSM) state transitions at VoIP node 210-i. For example, when there is a change in the state of finite-state machine (FSM) 100 at VoIP node 210-i, VoIP node 210-i might transmit a SIP message that is ignored by other VoIP nodes but that notifies call-monitoring system 220 of the FSM state transition.

It will be clear to those skilled in the art, after reading this disclosure, how to make and use VoIP nodes 210 in accordance with the illustrative embodiment. As will be appreciated by those skilled in the art, there are a variety of alternative techniques that might be employed for notifying call-monitoring system 220 of finite-state machine (FSM) state transitions at VoIP nodes 210, and it will be clear to those skilled in the art, after reading this disclosure, how to make and use VoIP nodes 210 that employ such techniques.

Call-monitoring system 220 is a data-processing system (e.g., server, etc.) that is capable of receiving signals that indicate when a new call initiated in telecommunications system 200, of receiving signals that indicate when a finite-state machine associated with a VoIP node 210 changes state during a call, and of executing the tasks described below and with respect to FIGS. 5 and 6.

As will be appreciated by those skilled in the art, although the illustrative embodiment employs a single centralized call-monitoring system 220, some other embodiments of the present invention might employ a plurality of call-monitoring systems 220 in a distributed manner (for example, a call-monitoring system embedded at every VoIP node), and it will be clear to those skilled in the art, after reading this disclosure, how to make and use such embodiments.

Execution profile library 230 is a data store (e.g., database, unstructured file system, data structure stored in main memory, etc.) that is capable of storing one or more finite-state machine execution profiles, which are described below and with respect to FIG. 3.

Rule base 240 is a data store (e.g., database, unstructured file system, data structure stored in main memory, etc.) that is capable of storing one or more rules that characterize a relationship among the execution of multiple FSMs, or among one or more FSMs across a plurality of calls, as is described in detail below and with respect to FIG. 4.

Figure 3:
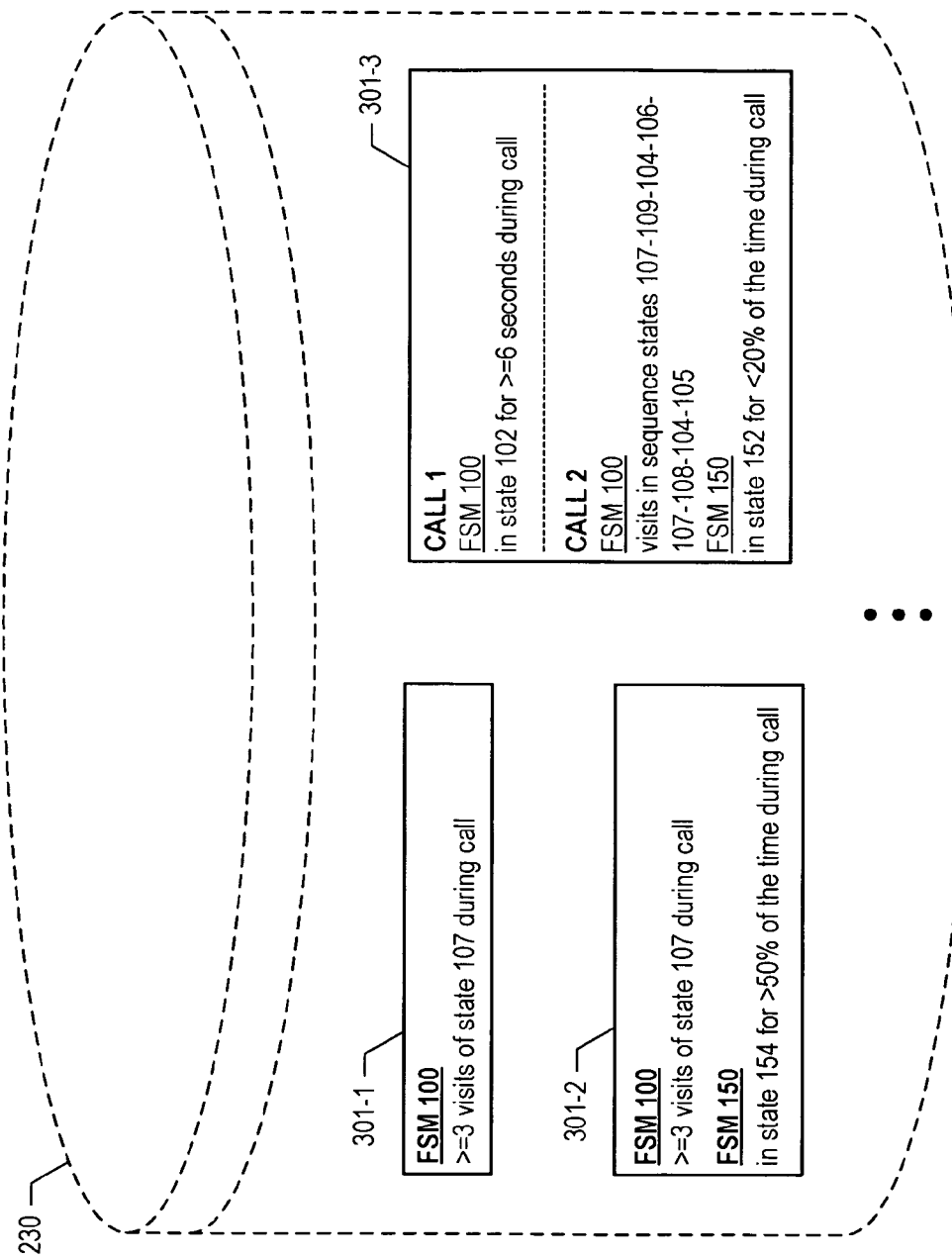
FIG. 3 depicts illustrative contents of execution profile library 230, as shown in FIG. 2, in accordance with the illustrative embodiment of the present invention.

FIG. 3 depicts illustrative contents of execution profile library 230, in accordance with the illustrative embodiment of the present invention. Execution profile library 230 comprises finite-state machine (FSM) execution profiles 301-1 through 301-N, where N is a positive integer. (For brevity only three execution profiles 301-1 through 301-3 are shown in FIG. 3.) Each FSM execution profile 301-j, where j is an integer between 1 and N inclusive, pertains to one or more particular finite-state machines (FSMs) and one or more calls, and provides a characterization of FSM behavior that has been associated with improper call behavior.

As shown in FIG. 3, execution profile 301-1 specifies that finite-state machine (FSM) 100 of FIG. 1 visits state 107 at least three times during a call. Thus, when a particular instance of FSM 100 for a particular calling terminal visits state 107 at least three times during a particular call, the behavior of FSM 100 matches that of execution profile 301-1.

The following two execution profiles (i.e., 301-2 and 301-3) characterize the behavior of both FSM 100, and another FSM 150 (not depicted in the drawings) that corresponds to the Session Initiation Protocol (SIP) at a called VoIP-capable terminal. As shown in FIG. 3, execution profile 301-2 specifies that both FSM 100 visits state 107 at least three times during a call, and FSM 150 is in state 154 for more than half of the time during that call.

Thus, execution profile 301-2 will match a call in which (i) an instance of FSM 100 for the calling terminal visits state 107 at least three times, and (ii) an instance of FSM 150 for a called terminal is in state 154 for at least half of the time.

As shown in FIG. 3, execution profile 301-3 specifies behavior for two calls. In the first call, FSM 100 spends at least six seconds in state 102, and in the second call, FSM 100 visits states in the following order: 107-109-104-106-107-108-104-105, and FSM 150 is in state 152 for less than 200% of the time.

As will be appreciated by those skilled in the art, the execution profiles depicted in FIG. 3 are merely illustrative, and it will be clear to those skilled in the art, after reading this disclosure, how to compose and use other kinds of execution profiles 301 in execution profile library 230. For example, in some other embodiments of the present invention, there might be other types of FSM behavior specified in the execution profiles, as well as execution profiles for many more finite-state machines, nodes, protocols, and so forth. Similarly, in some other embodiments of the present invention, additional information such as the identity of a caller, the identity of a called party, the time of a call, etc. might be incorporated into one or more of execution profiles 301.

Figure 4:
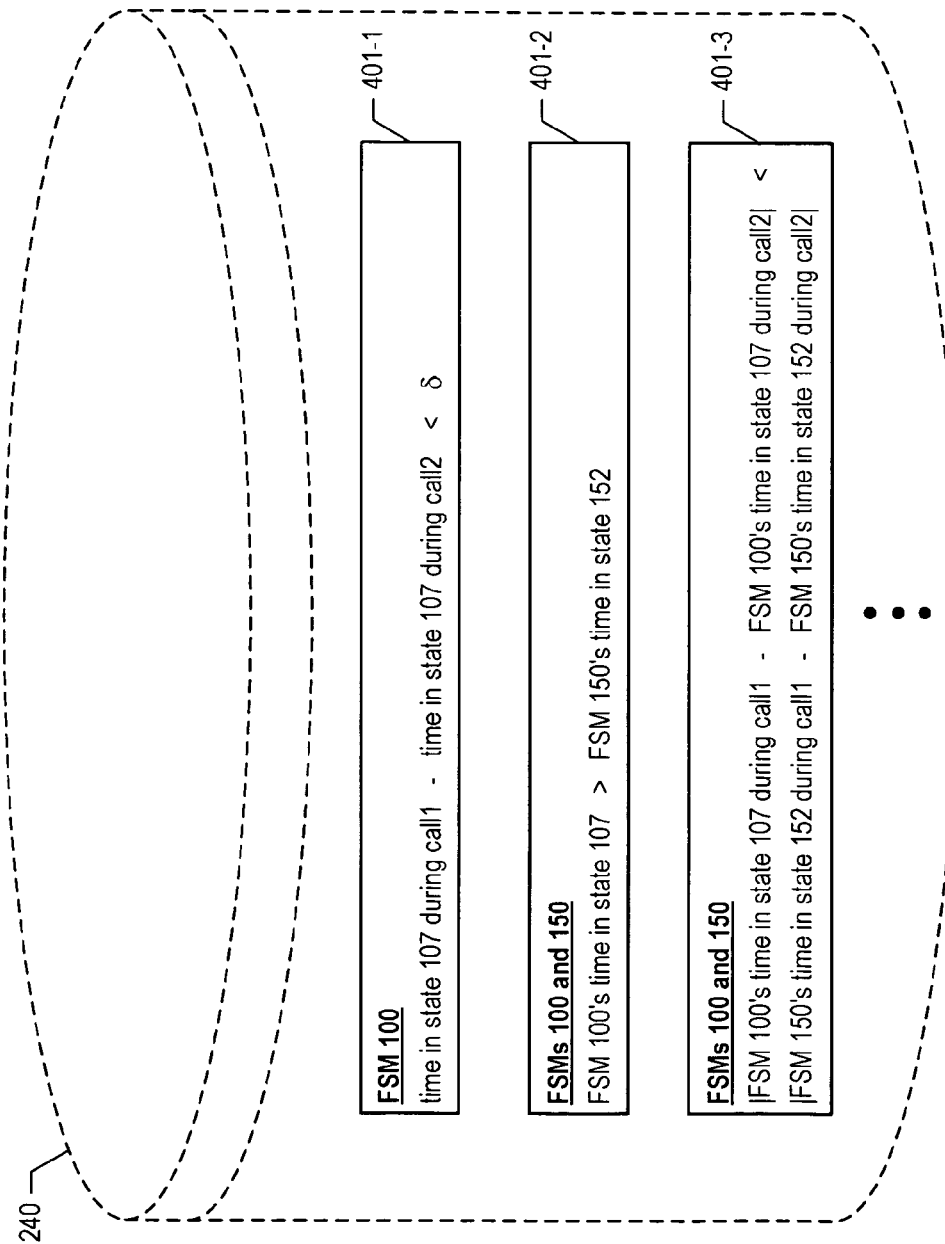
FIG. 4 depicts illustrative contents of rule base 240, as shown in FIG. 2, in accordance with the illustrative embodiment of the present invention.

FIG. 4 depicts illustrative contents of rule base 240, in accordance with the illustrative embodiment of the present invention. Rule base 240 comprises rules 401-1 through 401-M, where M is a positive integer. (For brevity only three rules 401-1 through 401-3 are shown in FIG. 4.) Each rule 401-*j*, where j is an integer between 1 and M inclusive, pertains to one or more particular finite-state machines (FSMs) and one or more calls, and specifies one or more conditions concerning the execution of the FSM(s) during the call(s) that has been associated with improper call behavior.

As shown in FIG. 4, rule 401-1 specifies that the amount of time FSM 100 spends in state 107 during a first call is roughly the same as the amount of time FSM 100 spends in state 107 during a second call, within a specified delta. Thus, when a particular instance of FSM 100 for a particular calling terminal spends roughly the same amount of time in state 107 during two different calls, the behavior of FSM 100 matches that of rule 401-1.

Whereas rule 401-1 pertains to a single finite-state machine and two calls, rule 401-2 specifies to two finite-state machines and a single call. In particular, rule 401-2 specifies that the amount of time that FSM 100 spends in state 107 during a call exceeds the amount of time that FSM 150 spends in state 152 during that call.

As shown in FIG. 4, rule 401-3 pertains to both a plurality of finite-state machines and a plurality of calls. In particular, rule 401-3 specifies that the difference in how long FSM 100 spends in state 107 for two different calls is less than the difference in how long FSM 150 spends in state 152 for those two calls.

As will be appreciated by those skilled in the art, in accordance with the illustrative embodiment, rules 401 of rule base 240 specify particular relationships between different FSMs and/or calls, while execution profiles 301 of execution profile library 230 essentially provide an "absolute" characterization of the behavior of FSMs during calls. As will further be appreciated by those skilled in the art, the rules depicted in FIG. 4 are merely illustrative, and it will be clear to those skilled in the art, after reading this disclosure, how to compose and use other kinds of rules 401 in rule base 240. For example, in some other embodiments of the present invention, one or more rules 401 might specify other types of relationships than those depicted in FIG. 4, as well as relationships among many more finite-state machines, nodes, protocols, and so forth. Similarly, in some other embodiments of the present invention, additional information such as the identity of a caller, the identity of a called party, the time of a call, etc. might be incorporated into one or more of rules 401.

Figure 5:
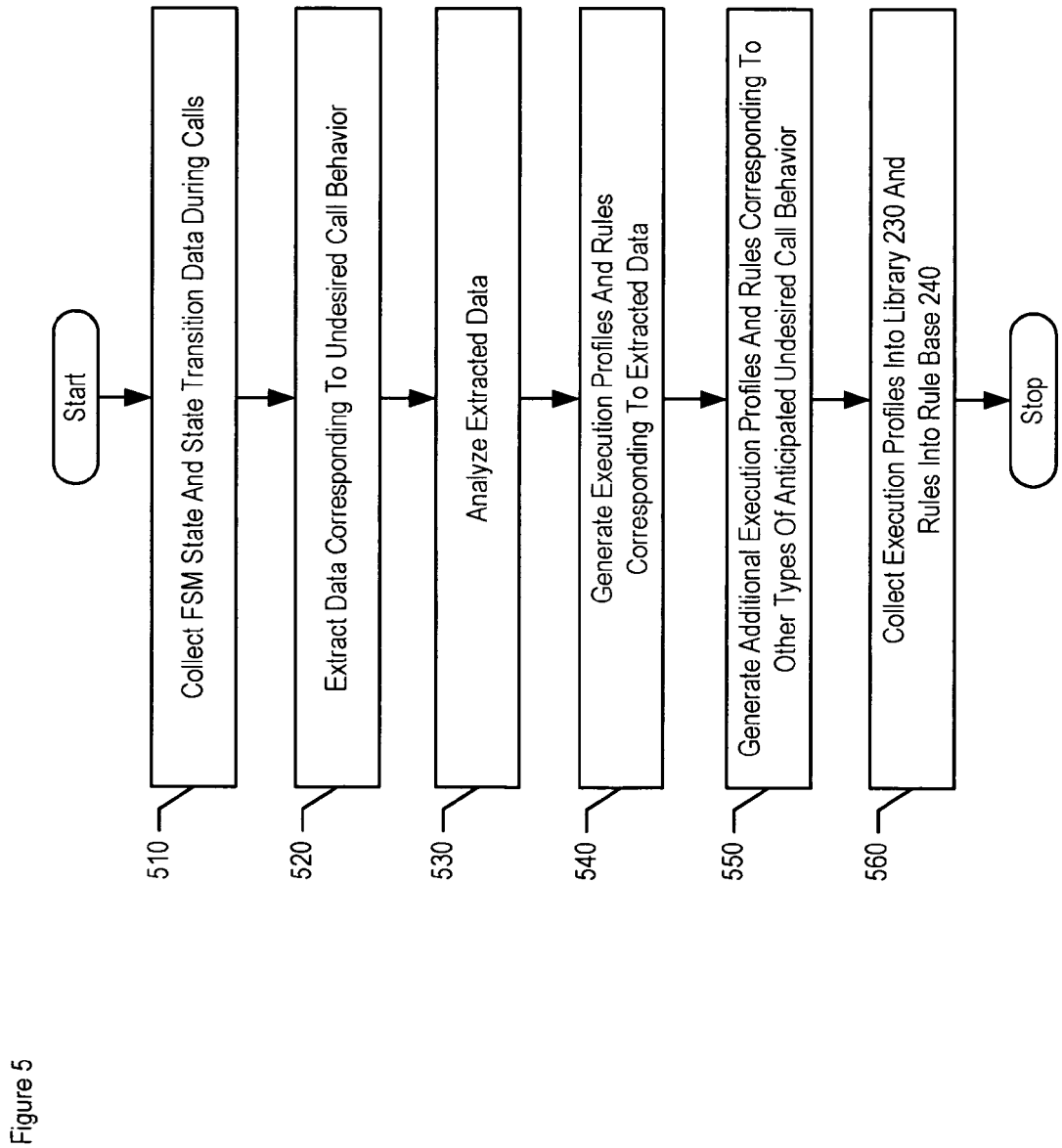
FIG. 5 depicts a flowchart of a method for building execution profile library 230, in accordance with the illustrative embodiment of the present invention.

FIG. 5 depicts a flowchart of a method for building execution profile library 230, in accordance with the illustrative embodiment of the present invention. It will be clear to those skilled in the art, after reading this disclosure, which tasks depicted in FIG. 5 can be performed simultaneously or in a different order than that depicted.

As will be appreciated by those skilled in the art, in some embodiments of the present invention the tasks of this method might be performed in an automated fashion via software, while in some other embodiments the tasks of this method might be performed by a human (e.g., an information technology [IT] professional, etc.), while in yet some other embodiments some of the tasks might be performed via software and some of the tasks might be performed by a human.

At task 510, finite-state machine (FSM) state and state transition data during calls are collected.

At task 520, data corresponding to improper call behavior is extracted from the data collected at task 510.

At task 530, the data extracted at task 520 is analyzed in order to discern patterns and formulate characterizations of FSM execution that are associated with improper call behavior.

At task 540, execution profiles and rules corresponding to the extracted data are generated based on the analysis of task 530.

At task 550, additional execution profiles and rules corresponding to other types of anticipated (but perhaps not yet observed) improper call behavior are generated.

At task 560, the execution profiles generated at tasks 540 and 550 are collected in execution profile library 230, and the rules generated at tasks 540 and 550 are collected in rule base 240. After task 560, the method of FIG. 5 terminates.

Figure 6:
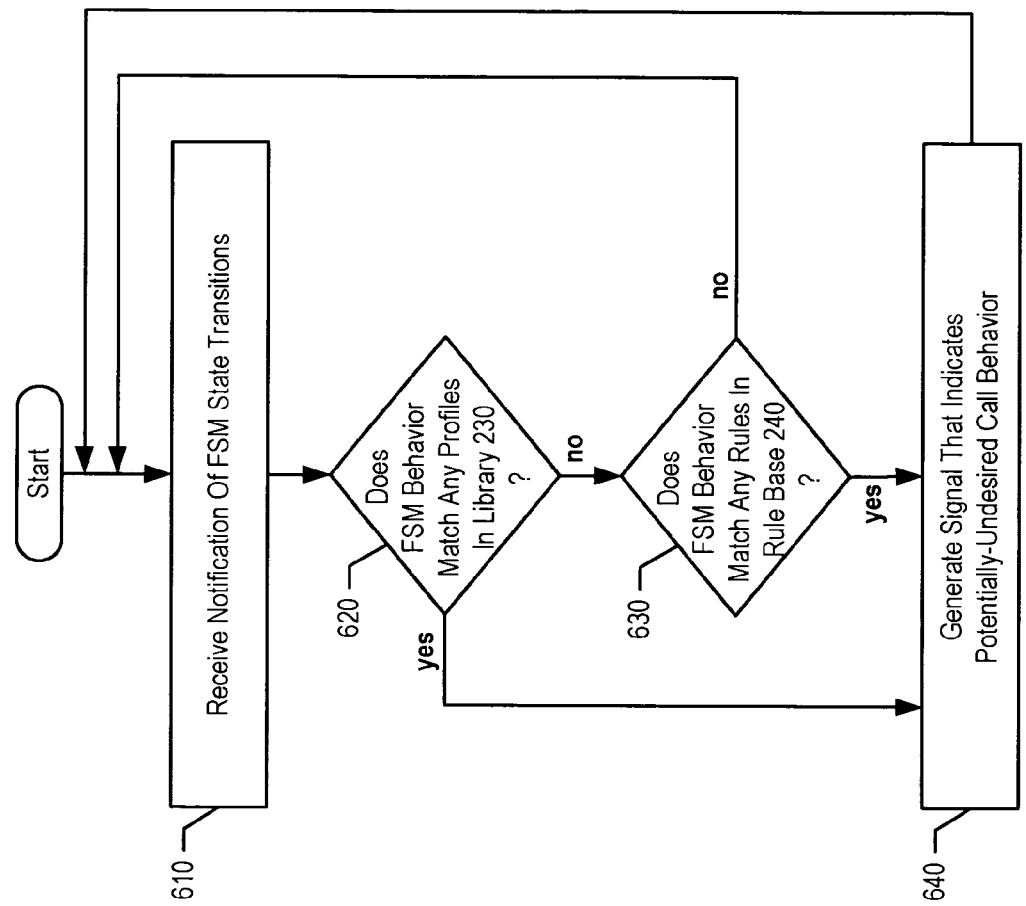
FIG. 6 depicts a flowchart of the salient tasks of call-monitoring system 220 in accordance with the illustrative embodiment of the present invention.

FIG. 6 depicts a flowchart of the salient tasks of call-monitoring system 220 in accordance with the illustrative embodiment of the present invention. It will be clear to those skilled in the art, after reading this disclosure, which tasks depicted in FIG. 6 can be performed simultaneously or in a different order than that depicted.

At task 610, call-monitoring system 220 receives a notification of one or more finite-state machine (FSM) state transitions.

At task 620, call-monitoring system 220 checks whether the behavior of any active finite-state machines matches any execution profiles in library 230. If so, execution proceeds to task 640, otherwise execution continues at task 630.

At task 630, call-monitoring system 220 checks whether the behavior of any active finite-state machines matches any rules in rule base 240. If so, execution proceeds to task 640, otherwise execution continues back at task 610.

At task 640, call-monitoring system 220 generates a signal that indicates potentially-improper call behavior. After task 640, execution continues back at task 610.

As will be appreciated by those skilled in the art, in some embodiments of the present invention the signal generated at task 640 might notify an information technology (IT) administrator of the potentially-improper call behavior, who might then take appropriate action, while in some other embodiments, the signal generated at task 640 might cause a data-processing system (e.g., call-monitoring system 220, etc.) or some other element of telecommunications system 200—perhaps not depicted in FIG. 2—to automatically respond and take action (e.g., add a particular caller to a blacklist, terminate a call in progress, re-configure a firewall or intrusion-detection system, etc.). In any of these cases, it will be clear to those skilled in the art, after reading this disclosure, how to make and use such embodiments of the present invention.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   determining, by a data-processing system, whether the execution of an instance of a first finite-state machine and an instance of a second finite-state machine during a call matches one or more execution profiles that are associated with improper call behavior, wherein said instance of said first finite-state machine corresponds to the state of a communications protocol at a first node, and wherein said instance of said second finite-state machine corresponds to the state of the communications protocol at a second node that is different than the first node, and wherein at least one of said execution profiles characterizes the execution of a plurality of finite-state machines, corresponding to the respective state of the communications protocol at the respective node, during a call; and when a match exists, generating, by a data-processing system, a signal that indicates a possible occurrence of improper call behavior, wherein the execution of a plurality of finite-state machines during a first call matches a first execution profile, and that the execution of said plurality of finite-state machines during a second call matches a second execution profile.

2. The method of claim 1 wherein said improper call behavior is engendered by a third node.

3. The method of claim 1 wherein at least one of said execution profiles comprises a sequence of visited states of a finite-state machine.

4. The method of claim 1 wherein at least one of said execution profiles comprises a metric that is based on how often one or more particular states of a finite-state machine are visited.

5. The method of claim 1 wherein at least one of said execution profiles comprises a metric that is based on how long a finite-state machine spends in one or more particular states.

6. A method comprising:
   determining, by a data-processing system, whether the execution of an instance of a first finite-state machine and of an instance of a second finite state machine during a call matches one or more rules that are associated with improper call behavior, wherein said instance of said first finite-state machine corresponds to the state of a communications protocol at a first node, and wherein said instance of said second finite-state machine corresponds to the state of the communications protocol at a second node that is different than the first node, and wherein at least one of said rules comprises a condition pertaining to the execution of a plurality of finite-state machines, corresponding to the respective state of the communications protocol at the respective node, during a call; and when a match exists, generating, by a data-processing system, a signal that indicates a possible occurrence of improper call behavior, wherein said condition specifies a relationship between how often said first finite-state machine visits a first non-empty set of states and how often said second finite-state machine visits a second non-empty set of states.

7. The method of claim 6 wherein said improper call behavior is engendered by a third node.

8. The method of claim 6 wherein said first finite-state machine corresponds to the state of a communications protocol at a calling terminal, and wherein said second finite state machine corresponds to the state of said communications protocol at a called terminal.

9. The method of claim 6 wherein said condition specifies a relationship between how long said first finite-state machine spends in a first non-empty set of states and how long said second finite-state machine spends in a second non-empty set of states.

10. A method comprising:
    determining, by a data-processing system, whether the execution of an instance of a first finite-state machine and of an instance of a second finite-state machine during a first call and during a second call matches one or more rules that are associated with improper call behavior, wherein said instance of said first finite-state machine corresponds to the state of a communications protocol at a first node, and wherein said instance of said second finite-state machine corresponds to the state of the communications protocol at a second node that is different than the first node, and wherein at least one of said rules comprises a condition pertaining to the execution of a plurality of finite-state machines, corresponding to the respective state of the communications protocol at the respective node, during a plurality of calls; and when a match exists, generating, by a data-processing system, a signal that indicates a possible occurrence of improper call behavior, wherein said condition specifies that the execution of a plurality of finite-state machines during a first call matches a first execution profile, and that the execution of said plurality of finite-state machines during a second call matches a second execution profile.

11. The method of claim 10 wherein said condition specifies that the execution of a plurality of finite-state machines during a first call is similar to the execution of said plurality of finite-state machines during a second call.

12. The method of claim 10 wherein said condition specifies that the execution of a plurality of finite-state machines during a first call is different than the execution of said plurality of finite-state machines during a second call.

13. The method of claim 10 wherein said condition specifies that the execution of a plurality of finite-state machines during a first call and during a second call both match a particular execution profile.

* * * * *